US010812958B2

(12) United States Patent
Thoukydides et al.

(10) Patent No.: US 10,812,958 B2
(45) Date of Patent: Oct. 20, 2020

(54) BLUETOOTH LOW ENERGY (BLE) DEVICE TRANSMITTING BLE ADVERTISING DATA, AND METHOD OF TRANSMITTING BLE ADVERTISING DATA

(71) Applicant: SAMSUNG ELECTRONICS CO., LTD., Suwon-si, Gyeonggi-Do (KR)

(72) Inventors: Alexander Thoukydides, Cambridge (GB); Clive Douglas Woon Feather, Cambridge (GB)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/249,395

(22) Filed: Jan. 16, 2019

(65) Prior Publication Data

US 2020/0228953 A1    Jul. 16, 2020

(51) Int. Cl.
| | |
|---|---|
| *H04B 7/00* | (2006.01) |
| *H04W 4/08* | (2009.01) |
| *H04W 4/38* | (2018.01) |
| *H04W 52/02* | (2009.01) |
| *H04W 4/80* | (2018.01) |
| *H04W 24/02* | (2009.01) |

(52) U.S. Cl.
CPC ............. *H04W 4/80* (2018.02); *H04B 7/00* (2013.01); *H04W 24/02* (2013.01)

(58) Field of Classification Search
CPC ....... H04W 4/80; H04W 24/02; H04W 8/005; H04W 52/0216; H04W 84/18; Y02D 70/144; Y02D 70/00; H04B 7/00
See application file for complete search history.

(56) References Cited

U.S. PATENT DOCUMENTS

| | | | |
|---|---|---|---|
| 8,737,917 B2* | 5/2014 | Desai | H04W 8/005 455/41.2 |
| 9,408,147 B2* | 8/2016 | Polo | H04W 52/0229 |
| 9,420,407 B2* | 8/2016 | Jakusovszky | H04W 48/10 |
| 10,334,528 B2* | 6/2019 | Viswanadham | H04L 12/1886 |
| 10,542,390 B2* | 1/2020 | Lee | H04W 8/24 |
| 2019/0012705 A1* | 1/2019 | Todeschini | H04W 4/38 |

* cited by examiner

*Primary Examiner* — Pablo N Tran
(74) *Attorney, Agent, or Firm* — F. Chau & Associates, LLC

(57) ABSTRACT

A BLUETOOTH Low Energy (BLE) device includes a BLUETOOTH transceiver, a memory storing a computer program, and a processor configured to execute the computer program. The computer program is configured to select a primary advertising channel as a target channel for transmission of a BLE advertising packet belonging to a BLE advertising event, and listen to the selected channel for a channel assessment time. Listening to the selected channel includes determining whether the selected channel is busy or idle. The computer program is further configured to transmit the BLE advertising packet on the selected channel when it is determined that the selected channel is idle during the channel assessment time.

20 Claims, 6 Drawing Sheets

ND METHOD OF TRANSMITTING BLE
BLUETOOTH LOW ENERGY (BLE) DEVICE TRANSMITTING BLE ADVERTISING DATA, AND METHOD OF TRANSMITTING BLE ADVERTISING DATA

TECHNICAL FIELD

Exemplary embodiments of the present invention relate to an improved BLUETOOTH Low Energy (BLE) device that transmits BLE advertising data, and an improved method of transmitting BLE advertising data.

DISCUSSION OF THE RELATED ART

A BLUETOOTH Low Energy (BLE) device typically initiates a BLE advertising event by selecting at least one primary advertising channel and transmitting a BLE advertising packet belonging to a BLE advertising event on the selected primary advertising channel. A common scenario includes a BLE device selecting one, two or three primary advertising channels, and transmitting one, two or three BLE advertising packets, which belong to a BLE advertising event, sequentially and respectively on the one, two or three primary advertising channels. In accordance with current BLE standards, channels 37, 38 and 39 within the 2.4 GHz Industrial Scientific and Medical (ISM) band may be designated as the primary advertising channels.

SUMMARY

According to an exemplary embodiment of the present invention, a BLUETOOTH Low Energy (BLE) device includes a BLUETOOTH transceiver, a memory storing a computer program, and a processor configured to execute the computer program. The computer program is configured to select a primary advertising channel as a target channel for transmission of a first BLE advertising packet belonging to a BLE advertising event, and listen to the selected channel for a channel assessment time. Listening to the selected channel comprises determining whether the selected channel is busy or idle. The computer program is further configured to transmit the first BLE advertising packet on the selected channel when it is determined that the selected channel is idle during the channel assessment time.

In an exemplary embodiment, the computer program is configured to delay transmitting the first BLE advertising packet on the selected channel when it is determined that the selected channel is busy during the channel assessment time.

In an exemplary embodiment, the computer program is configured to delay transmitting the first BLE advertising packet by setting a back-off time, starting a timer when the selected channel becomes idle after the channel assessment time, and transmitting the first BLE advertising packet on the selected channel when a value of the timer is equal to or greater than the back-off time.

In an exemplary embodiment, the computer program is configured to pause the timer each time the selected channel becomes busy, and resume the timer each time the selected channel becomes idle.

In an exemplary embodiment, the BLE device does not transmit the first BLE advertising packet on the selected channel when the value of the timer is less than the back-off time and when an advertising event window is closed.

In an exemplary embodiment, the computer program is configured to randomly or pseudo-randomly generate the back-off time.

In an exemplary embodiment, the computer program is configured to determine that the selected channel is busy when a preamble or an access address of a BLE advertising packet transmitted by another BLE device is detected on the selected channel.

In an exemplary embodiment, a minimum duration of the channel assessment time is equal to a sum of a maximum length of the BLE advertising packet transmitted by the another BLE device, a length of the preamble of the BLE advertising packet transmitted by the another BLE device, and a length of an access address of the BLE advertising packet transmitted by the another BLE device.

In an exemplary embodiment, the minimum duration of the channel assessment time is equal to about 416 µs or about 1,854 µs.

In an exemplary embodiment, the primary advertising channel is channel 37, channel 38, or channel 39 included in a 2.4 GHz Industrial Scientific and Medical (ISM) radio band.

In an exemplary embodiment, the computer program is configured to select a time advDelay and begin the BLE advertising event at a time T_advEvent after a starting time of transmission of a previous BLE advertising event. advDelay is a randomly or pseudo-randomly generated delay time, and is independently randomly or pseudo-randomly generated for each of a plurality of BLE advertising events including the BLE advertising event. T_advEvent=advInterval+advDelay, where advInterval is a BLE advertising interval used by the BLE device for all advertising events belonging to an advertising data set transmitted by the BLE device.

In an exemplary embodiment, advInterval is between about 20 ms and about 10,485.759375 seconds, and advDelay is between about 0 ms and about 10 ms.

In an exemplary embodiment, the computer program is configured to determine that the selected channel is busy when an amount of power detected by the BLUETOOTH transceiver exceeds a predefined threshold.

According to an exemplary embodiment of the present invention, a method of transmitting BLE advertising data includes selecting, by a BLE device, a primary advertising channel as a target channel for transmission of a first BLE advertising packet belonging to a BLE advertising event, and listening, by the BLE device, to the selected channel for a channel assessment time. Listening to the selected channel includes determining whether the selected channel is busy or idle. The method further includes transmitting, by the BLE device, the first BLE advertising packet on the selected channel when it is determined that the selected channel is idle during the channel assessment time.

In an exemplary embodiment, the method further comprises delaying transmitting the first BLE advertising packet on the selected channel when it is determined that the selected channel is busy during the channel assessment time.

In an exemplary embodiment, delaying transmitting the first BLE advertising packet includes setting a back-off time, starting a timer when the selected channel becomes idle after the channel assessment time, and transmitting the first BLE advertising packet on the selected channel when a value of the timer is equal to or greater than the back-off time.

In an exemplary embodiment, the method further includes pausing the timer each time the selected channel becomes busy, and resuming the timer each time the selected channel becomes idle.

In an exemplary embodiment, the first BLE advertising packet is not transmitted on the selected channel when the value of the timer being less than the back-off time and when an advertising event window is closed.

In an exemplary embodiment, the back-off time is a randomly or pseudo-randomly generated number.

In an exemplary embodiment, the selected channel is determined to be busy when a preamble or an access address of a BLE advertising packet transmitted by another BLE device is detected on the selected channel.

In an exemplary embodiment, a minimum duration of the channel assessment time is equal to a sum of a maximum length of the BLE advertising packet transmitted by the another BLE device, a length of the preamble of the BLE advertising packet transmitted by the another BLE device, and a length of an access address of the BLE advertising packet transmitted by the another BLE device.

In an exemplary embodiment, the minimum duration of the channel assessment time is equal to about 416 µs or about 1,854 µs.

In an exemplary embodiment, the primary advertising channel is channel 37, channel 38, or channel 39 included in a 2.4 GHz Industrial Scientific and Medical (ISM) radio band.

In an exemplary embodiment, the BLE advertising event begins at a time T_advEvent after a starting time of transmission of a previous BLE advertising event, in which T_advEvent=advInterval+advDelay. advInterval is a BLE advertising interval used by the BLE device for all advertising events belonging to an advertising data set transmitted by the BLE device. advDelay is a randomly or pseudo-randomly generated delay time selected by the BLE device, and is independently randomly or pseudo-randomly generated for each of a plurality of BLE advertising events including the BLE advertising event.

In an exemplary embodiment, advInterval is between about 20 ms and about 10,485.759375 seconds, and advDelay is between about 0 ms and about 10 ms.

In an exemplary embodiment, the method further includes detecting, by the BLE device, an amount of power received by a BLUETOOTH transceiver of the BLE device, and determining that the selected channel is busy when the detected amount of power exceeds a predefined threshold.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
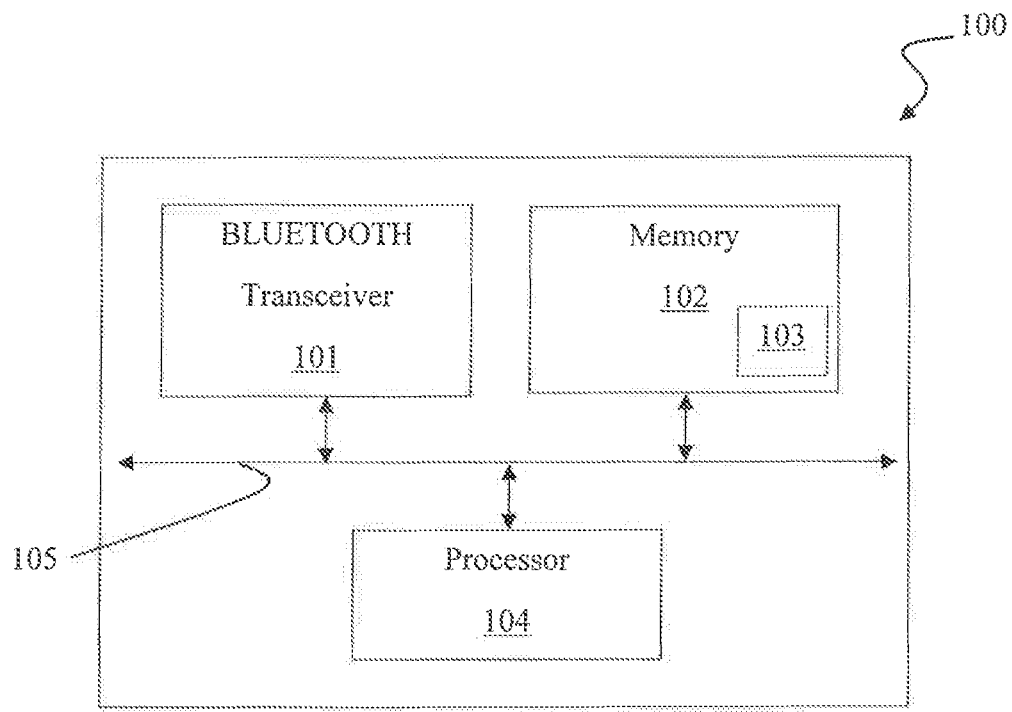
FIG. 1 is a block diagram of a BLUETOOTH Low Energy (BLE) device according to an exemplary embodiment of the present invention.

Exemplary embodiments of the present invention will be described more fully hereinafter with reference to the accompanying drawings Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Herein, when one value is described as being about equal to another value, e.g. "a duration is between about 0 ms and about 10 ms", it is to be understood that the values are equal to each other to within a measurement error, or if measurably unequal, are close enough in value to be functionally equal to each other as would be understood by a person having ordinary skill in the art or as would be permitted by the BLE specification. That is, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of ordinary skill in the art.

Exemplary embodiments of the present invention are directed to an improved BLUETOOTH Low Energy (BLE) device that transmits BLE advertising data, and an improved method of transmitting BLE advertising data.

Exemplary embodiments of the present invention provide a BLE advertising transmission scheme in which the timing of advertising transmissions is adapted based on channel usage. For example, rather than predefining specific transmission times and transmitting advertising packets according to those transmissions times regardless of channel usage, a BLE device according to exemplary embodiments instead listens to the channel on which it wishes to transmit a BLE advertising packet, and delays or avoids transmitting the BLE advertising packet if a transmission from another nearby device is detected that would result in a collision.

As described in detail below, a BLE device according to exemplary embodiments of the present invention transmits BLE advertising data in a manner such that the number of collisions between BLE advertisements is significantly reduced. Reducing the number of collisions between BLE advertisements improves reliability, latency and power consumption. Exemplary embodiments may be implemented in BLUETOOTH mesh networks, in which collisions are more likely to occur. However, exemplary embodiments of the present invention are not limited to utilization in BLUETOOTH mesh networks. For example, exemplary embodiments may be utilized in any scenario in which BLE devices transmit advertising data. BLE devices according to exemplary embodiments of the present invention may comply with the standardized BLUETOOTH specification. As a result, BLE devices according to exemplary embodiments pass all BLUETOOTH qualification tests, comply with the BLUETOOTH Special Interest Group (SIG) membership agreement, and may be used with all other devices that comply with the standardized BLUETOOTH specification.

FIG. 1 is a block diagram of a BLE device according to an exemplary embodiment of the present invention.

As shown in FIG. 1, in an exemplary embodiment, a BLE device 100 includes a BLUETOOTH transceiver 101, a memory 102 storing a computer program 103, and a processor 104 configured to execute the computer program 103. The BLUETOOTH transceiver 101, the memory 102, and the processor 104 are connected to one another and communicate with one another via, for example, a data bus 105. The BLE device 100 operates under the control of the processor 104 executing instructions of the computer program 103. Operation of the BLE device 100 will be described in detail below. The transceiver 101 is capable of detecting at least a preamble and an access address of a BLE advertising packet. In exemplary embodiments, the transceiver 101 may include a power meter capable of detecting an amount of power arriving at the antenna of the transceiver 101, as described in more detail below.

BLE transmissions are typically sent via 40 physical channels in the 2.4 GHz Industrial Scientific and Medical (ISM) band. BLE transmissions may include data transmissions and advertising transmissions. Three of the 40 channels are reserved for advertising transmissions, and 37 of the 40 channels are reserved for data transmissions. For example, as defined by the BLE standard, the three channels reserved for advertising transmissions are channels 37, 38 and 39 included in the 2.4 GHz ISM band. In BLUETOOTH 5.0 and higher, the channels reserved for data transmissions may also be used as secondary advertising channels. Advertising allows a BLE device to broadcast information that indicates the BLE device's objectives. For example, a BLE device may function as a beacon that advertises information to any device that is listening, or a BLE device may request a connection to a specific device (e.g., a smartwatch requesting a connection to a smartphone). Advertising allows a BLE device to indicate, for example, which one of these types of devices it is.

Figure 2:
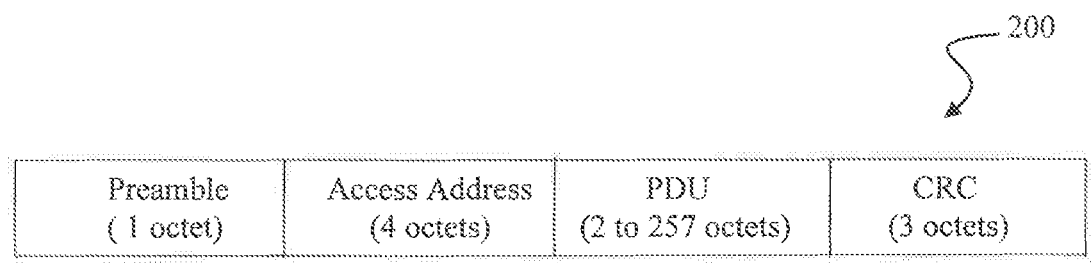
FIG. 2 shows an exemplary BLE packet format.

The packet format for a BLE advertising transmission and a BLE data transmission is the same. FIG. 2 shows an exemplary BLE packet format. As shown in FIG. 2, a BLE packet 200 includes a preamble, an access address, a protocol data unit (PDU), and a cyclic redundancy check (CRC). The length of the preamble is 1 octet, the length of the access address is 4 octets, the length of the PDU is 2 to 257 octets, and the length of the CRC is 3 octets.

According to BLUETOOTH 5.0 and higher, the preamble may be 2 octets, and in BLUETOOTH 5.1, the CRC may be followed by a Constant Tone Extension. However, for convenience of description, these portions are omitted in the exemplary BLE packet format shown in FIG. 2.

An advertising PDU includes a 16 bit header and a variable size payload of up to 37 octets. In BLUETOOTH 5.1 and higher, the header may be 24 bits. An advertising PDU may have different types, one type being ADV_NONCONN_IND. ADV_NONCONN_IND indicates that the BLE device sending the advertising packet is functioning as a non-connectable BLE device that is advertising information to any listening device. An ADV_NONCONN_IND PDU has a 1 octet preamble, a 4 octet access address, a 2 octet PDU header, a payload of up to 37 octets, and a 3 octet CRC.

Herein, a BLE advertising event transmitted by a BLE device refers to a group of up to three BLE advertising packets sent by the BLE device. The BLE advertising packets are transmitted in quick succession on primary channels (e.g., channels 37, 38 and 39 of the 2.4 GHz ISM radio band). Herein, the terms "primary channels" and "primary advertising channels" may be used interchangeably. For example, in a single BLE advertising event, a first BLE advertising packet may be transmitted on channel 37, a second BLE advertising packet may be transmitted on channel 38, and a third BLE advertising packet may be transmitted on channel 39. However, the primary channels are not limited thereto. The BLE advertising packets may be transmitted sequentially. Further, it is not required that all three BLE advertising packets belonging to a BLE advertising event be respectively transmitted on all three primary channels. For example, as described in further detail below, in certain scenarios, some of the BLE advertising packets may not be transmitted if an advertising event window has closed before transmission.

It is noted that although exemplary embodiments described herein may refer to three BLE advertising packets being sequentially transmitted on three primary advertising channels, respectively, exemplary embodiments are not limited thereto. For example, in exemplary embodiments, less than three BLE advertising packets may be transmitted sequentially and respectively on a corresponding number of primary advertising channels. Further, in exemplary embodiments, four or more BLE advertising packets may be transmitted sequentially and respectively on a corresponding number of primary advertising channels.

A BLUETOOTH mesh network allows for many-to-many communication using BLUETOOTH transmissions. A BLUETOOTH mesh network may include a high density of BLUETOOTH devices (e.g., BLE devices), many of which are always on and use a flood routing method, which results in a high number of packets transmitted at a particular location at a particular time. As a result, the likelihood of transmitted packets colliding in a BLUETOOTH mesh network is very high.

A BLUETOOTH mesh network uses non-connectable and non-scannable undirected advertising events. Thus, in a BLUETOOTH mesh network, BLE devices transmit BLE advertising packets having a PDU of type ADV_NONCONN_IND. As described above, an ADV_NONCONN_IND PDU has a 1 octet preamble, a 4 octet access address, a 2 octet PDU header, a payload of up to 37 octets, and a 3 octet CRC. As a result, the maximum duration of the ADV_NONCONN_IND PDU is about 376 µs and the duration of its preamble and access address is about 40 µs.

Figure 3A:
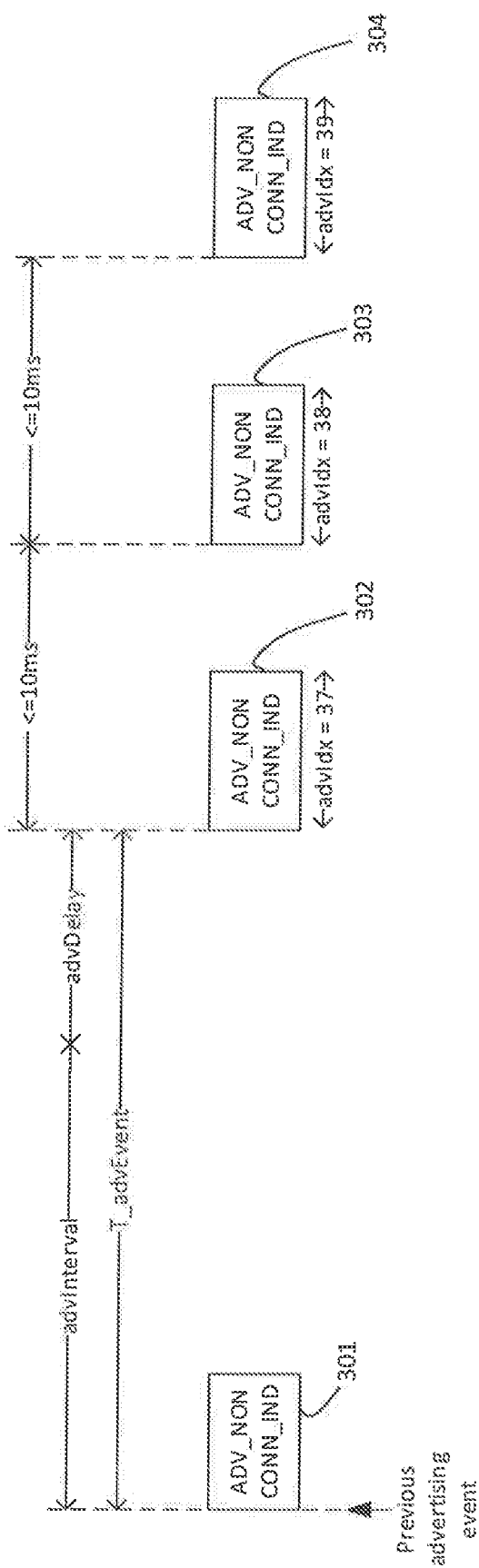
FIG. 3A is a timing chart illustrating a process of a BLE device transmitting advertising data according to a comparative example.
Figure 3B:
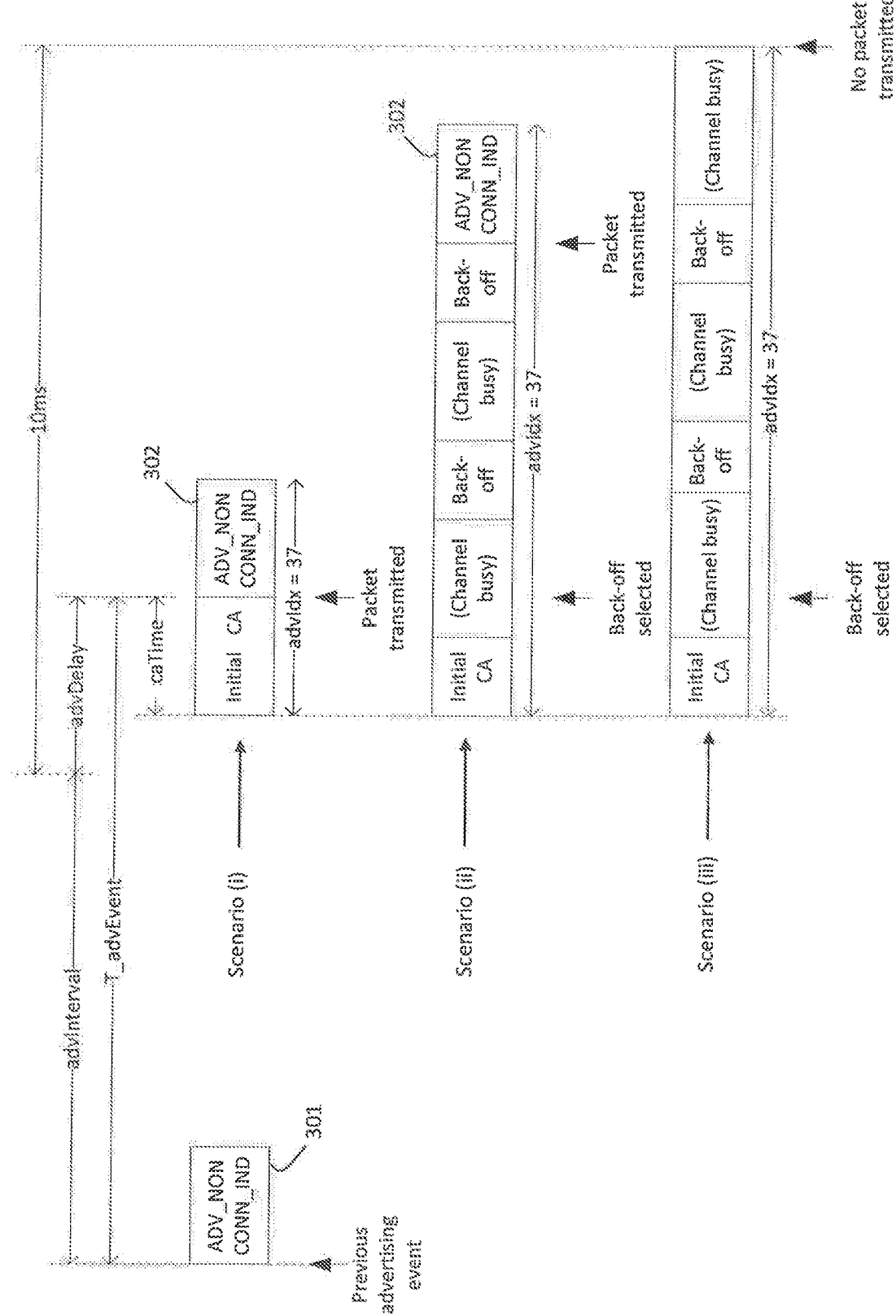
FIGS. 3B and 3C are timing charts illustrating a process of a BLE device transmitting advertising data according to an exemplary embodiment of the present invention.
Figure 3C:
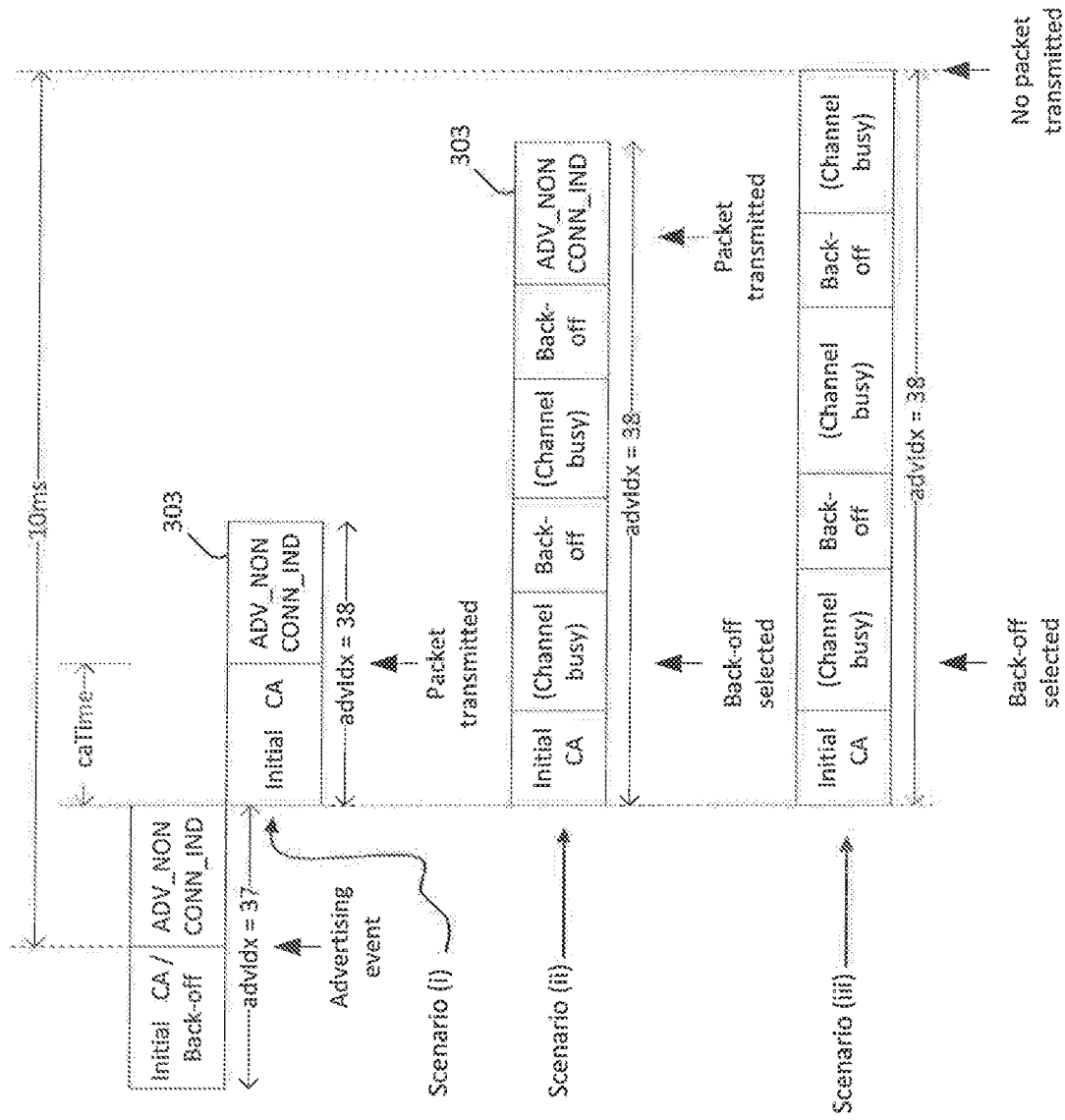

FIG. 3A is a timing chart illustrating a process of a BLE device transmitting advertising data according to a comparative example. FIGS. 3B and 3C are timing charts illustrating a process of a BLE device transmitting advertising data according to an exemplary embodiment of the present invention.

Referring to FIG. 3A, a BLE device according to a comparative example does not perform any type of channel availability determination when initiating a BLE advertising event. That is, the BLE device according to the comparative example initiates a BLE advertising event regardless of the state of a target advertising channel (e.g., without checking to determine whether a target advertising channel is idle). For example, the BLE device according to the comparative example randomly or pseudo-randomly selects a delay time advDelay, and begins transmission of a BLE advertising packet belonging to a BLE advertising event as soon as the selected delay time elapses, regardless of whether the target advertising channel is busy or idle at that time. For example, the BLE device according to the comparative example may initiate a BLE advertising event by transmitting three BLE advertising packets 302, 303 and 304, which belong to the BLE advertising event, sequentially and respectively on three primary channels (e.g., channels 37, 38 and 39 of the 2.4 GHz ISM band) after transmission of a BLE advertising packet 301 of a previous advertising event, as shown in FIG. 3A. advInterval, advDelay and T_advEvent shown in FIG. 3A are described further below.

In this case, when initiating transmission of a BLE advertising event, the BLE device according to the comparative example may select randomly or pseudo-randomly a delay time (e.g., 10 ms), and may immediately begin transmitting the first BLE advertising packet 302 of the BLE advertising event on channel 37 (denoted by advIdx=37) as soon as this selected delay time elapses, regardless of whether channel 37 is busy or idle. The BLE device according to the comparative example may then immediately begin transmitting the second BLE advertising packet 303 on channel 38 (denoted by advIdx=38), and the third BLE advertising packet 304 on channel 39 (denoted by advIdx=39) in a similar manner. As a result, when there is a high density of BLE devices transmitting BLE advertising events, such as in a BLUETOOTH mesh network, many collisions may occur between BLE advertising packets, since transmission of BLE advertising packets by a large number of BLE devices on the same channel may overlap in time and frequency. For example, many BLE advertising packets may be transmitted on the same channel, and at least some parts of the BLE advertising packets may be transmitted at the same time. This may occur as a result of BLE advertising packets being transmitted as soon as their respective delay times elapse, without taking into account whether the target channel is busy or idle. The occurrence of a high number of collisions may cause reliability and latency issues in the network, as well as increasing power consumption in each device.

To reduce the chance of collisions, a BLE device 100 according to exemplary embodiments of the present invention utilizes a channel assessment time caTime, as shown in FIGS. 3B and 3C. For example, a BLE device 100 according to exemplary embodiments does not immediately attempt to transmit a BLE advertising packet after a randomly or pseudo-randomly selected delay time has elapsed. Rather, prior to transmitting a BLE advertising packet on one of the three primary advertising channels, the BLE device 100 first listens to the target channel (e.g. one of the three primary channels) to determine whether the target channel is busy or idle. If the target channel is idle for the duration of the channel assessment time caTime, the BLE device 100 transmits the BLE advertising packet on the target channel. Alternatively, if the target channel is busy during the channel assessment time caTime, then the BLE device 100 delays transmitting the BLE advertising packet until the target channel becomes idle and remains idle for a randomly or pseudo-randomly selected back-off time, as described in further detail below. If the BLE advertising packet cannot be transmitted within the time permitted by the standardized BLUETOOTH specification (e.g., within the advertising event window, which is described below), then the BLE advertising packet is not transmitted.

According to exemplary embodiments, a target channel is considered to be busy when a preamble or an access address of another BLE advertising packet belonging to another BLE advertising event (e.g., a BLE advertising event transmitted by another BLE device) is detected on the target channel. According to exemplary embodiments, a target channel is considered to be idle at all other times.

According to exemplary embodiments, the minimum duration of the channel assessment time caTime is set to be sufficient such that a preamble and an access address are able to be seen during the listening operation. Thus, the minimum channel assessment time caTime is equal to the duration of the maximum length of a BLE advertising packet that is expected on the primary channel (hereinafter referred to as an "expected BLE advertising packet"), plus the length of a preamble of the expected BLE advertising packet and the length of an access address of the expected BLE advertising packet. For example, the minimum channel assessment time caTime may be equal to the sum of the maximum length of the expected BLE advertising packet (e.g. 47 octets), the length of the preamble of the expected BLE advertising packet (e.g., 1 octet), and the length of the access address of the expected BLE advertising packet (e.g., 4 octets). The maximum duration of the packet containing the ADV_NONCONN_IND PDU (e.g., the expected BLE advertising packet) is therefore about 376 µs, and the maximum duration of the preamble and access address combined is about 40 µs. Thus, the minimum duration of the channel assessment time caTime is about 416 µs. In exemplary embodiments, the channel assessment time caTime may have a duration longer than the minimum duration, which may improve coexistence with non-mesh advertisements.

The term "expected BLE advertising packet" does not necessarily refer to a specific BLE advertising packet being transmitted, but rather, to any one of BLE advertising packets that are expected to be received on the primary advertising channels.

Exemplary embodiments may operate in a BLUETOOTH 5.0 environment. BLUETOOTH 5.0 introduces new packet types, including a packet type ADV_EXT_IND. BLUETOOTH 5.0 also introduces the LE Coded PHY, which is also referred to as BLE Long Range. BLE Long Range uses slower transmissions to increase the effective range of the transmitted signals. When BLE Long Range is not in use, the maximum length of the expected advertising packet expected on the primary advertising channels remains about 376 µs. However, when BLE Long Range is in use, the maximum length of the expected advertising packet expected on the primary advertising channels increases to about 1,518 µs, and the maximum duration of the preamble and access address combined increases to about 336 µs. Thus, when the BLE device 100 operates using the LE Coded PHY in compliance with BLUETOOTH 5.0, the minimum duration of the channel assessment time caTime is about 1,854 µs.

For convenience of description, when specific packet lengths are described herein, the lengths are assumed to correspond to pre-BLUETOOTH 5.0 standards unless the context indicates otherwise.

Referring to FIGS. 3B and 3C, the timing charts illustrate the transmission of BLE advertising packets by the BLE device 100 on primary channels 37 and 38 respectively, according to an exemplary embodiment of the present invention. As described above, when transmitting a BLE advertising event, the BLE device 100 may transmit a first BLE advertising packet on primary channel 37, may then transmit a second BLE advertising packet on primary channel 38 after the first BLE advertising packet has been transmitted on primary channel 37, and may then transmit a third BLE advertising packet on primary channel 39 after the second BLE advertising packet has been transmitted on primary channel 38. With relation to this process, FIG. 3B illustrates transmission of a first BLE advertising packet on primary channel 37, and FIG. 3C illustrates transmission of a second BLE advertising packet on primary channel 38 after the first BLE advertising packet has been transmitted on primary channel 37.

For convenience of description, FIGS. 3B and 3C illustrate the transmission of a first BLE advertising packet on primary channel 37 and a second BLE advertising packet on primary channel 38, and omit illustration of the transmission of a third BLE advertising packet on primary channel 39. However, it is to be understood that the same sequence described with reference to the first and second BLE advertising packets in FIGS. 3B and 3C may be repeated for transmission of the third BLE advertising packet, using the timing of the second BLE advertising packet as a reference.

Each of FIGS. 3B and 3C illustrate three transmission scenarios (i), (ii), and (iii), which are described below. Further, it is noted that in FIGS. 3B and 3C, the BLE advertising packets have a PDU type of ADV_NONCONN_IND. In addition, it is noted that the timing charts of FIGS. 3B and 3C comply with the standardized BLUETOOTH specification timing requirements.

At the start of advertising (e.g., before any advertising events are initiated), the BLE device 100 selects an advertising interval advInterval, which is a value selected from the range of about 20 ms to about 10,485.759375 seconds. Alternatively, the BLE device 100 may select bounds within the range of about 20 ms to about 10,485.759375 seconds, and then select a value from within those bounds as the advertising interval advInterval. The selected advertising interval advInterval is used by the BLE device 100 for all advertising events belonging to an advertising data set transmitted by the BLE device 100. For example, the BLE device 100 may advertise one set of data, or may advertise a plurality of sets of data. For example, the BLE device 100 may initiate advertising one set of data and stop, then initiate advertising another set of data and stop, etc. The advertising interval advInterval is independently selected for each of these data sets transmitted by the BLE device 100, and applies to all advertising events respectively belonging to each of these data sets. As an example, if a BLE device 100 transmits five different advertising sets, each of these five advertising sets may include a plurality of advertising events, and the advertising interval advInterval is independently selected for each of these five data sets and is applied to the advertising events respectively belonging to each of these five data sets. In exemplary embodiments, the BLE device 100 may transmit multiple advertising data sets in parallel, in which the advertising interval advInterval is independently selected for each of these advertising data sets.

Once the advertising interval advInterval has been selected, the BLE device 100 selects a delay time advDelay for each advertising event. The delay time advDelay is a randomly or pseudo-randomly generated value between about 0 ms and about 10 ms. Thus, for every advertising event performed by the BLE device 100, the delay time advDelay is randomly or pseudo-randomly generated such that the delay time advDelay is independently selected for each advertising event. The ranges for the advertising interval advInterval and the delay time advDelay comply with the standardized BLUETOOTH specification timing requirements.

The first BLE advertising packet of a current BLE advertising event is not permitted to be transmitted any sooner than at a time T_advEvent after the start of the first BLE advertising packet of a previous BLE advertising event, in which T_advEvent=advInterval+advDelay. That is, a current BLE advertising event is not permitted to begin any sooner than at the time T_advEvent after a starting time of transmission of a previous BLE advertising event. This is shown in FIG. 3B. For example, referring to FIG. 3B, a previous advertising event begins with the transmission of the BLE advertising packet 301. After the time T_advEvent elapses, the BLE device 100 attempts to begin a current BLE advertising event. FIG. 3B illustrates three possible scenarios that can occur when the BLE device 100 attempts to begin the current BLE advertising event according to an exemplary embodiment of the present invention.

In scenario (i), the first BLE advertising packet 302 of the current BLE advertising event is transmitted on primary channel 37 (denoted by advIdx=37) after the channel assessment time caTime has elapsed. Initial CA in FIGS. 3B and 3C denotes a period of time during the channel assessment time caTime that the channel is determined to be idle. During the channel assessment time caTime, the BLE device 100 listens to the target primary channel (e.g., channel 37 in FIG. 3B) to determine whether the target primary channel is busy or idle. In scenario (i), channel 37 is idle during the entirety of the channel assessment time caTime. Thus, the BLE device 100 transmits the first BLE advertising packet 302 after the channel assessment time caTime has elapsed.

In scenario (ii), the first BLE advertising packet 302 is not transmitted immediately after the channel assessment time caTime has elapsed. Rather, the BLE device 100 delays transmission of the first BLE advertising packet 302 when the BLE device 100 determines that the target primary channel (e.g., channel 37) is busy during the channel assessment time caTime. The first BLE advertising packet 302 is then transmitted later after a back-off time. For example, in scenario (ii), during the channel assessment time caTime, the BLE device 100 listens to the target primary channel (e.g., channel 37) and determines that channel 37 is busy during the channel assessment time caTime. In this case, the BLE device 100 sets a back-off time since channel 37 is busy during the channel assessment time caTime. Once channel 37 becomes idle after the channel assessment time caTime, the BLE device 100 starts a timer. The timer counts up until it reaches the back-off time. For example, if the back-off time is set to about 2 ms, the timer starts at 0 ms and counts up until it reaches about 2 ms.

The timer is paused each time channel 37 becomes busy, and the timer is resumed each time channel 37 becomes idle. This can be seen in scenario (ii). For example, channel 37 is determined to be busy at a point during the channel assessment time caTime. Once channel 37 is no longer busy, the back-off time is utilized by way of the timer counting up toward the back-off time. As shown in scenario (ii), channel 37 is determined to be busy for a second time. When this happens, the timer is paused and does not count up toward the back-off time (e.g., the timer does not count up toward the back-off time when the channel is busy). Once the second instance of channel 37 being busy is over, the timer resumes counting up toward the back-off time. Once the timer reaches the back-off time, the first BLE advertising packet 302 is transmitted (e.g., once the value of the timer is equal to or greater than the back-off time, the first BLE advertising packet 302 is transmitted).

According to exemplary embodiments, the back-off time is randomly or pseudo-randomly generated, and the back-off time may be less than or equal to about 2 ms. In scenario (iii), the timer does not reach the back-off time before the advertising event window is closed. In this case, the BLE device 100 does not transmit the first BLE advertising event 302 on the target primary channel (e.g., channel 37). For example, in scenario (iii), during the channel assessment time caTime, the BLE device 100 listens to the target primary channel (e.g., channel 37) and determines that channel 37 is busy during the channel assessment time caTime. In this case, the BLE device 100 sets a back-off time since channel 37 is busy during the channel assessment time caTime. Once channel 37 becomes idle after the channel assessment time caTime, the BLE device 100 starts the timer.

As described above, the timer is paused each time channel 37 becomes busy, and the timer is resumed each time channel 37 becomes idle. For example, in scenario (iii), channel 37 is determined to be busy at a point during the channel assessment time caTime. Once channel 37 is no longer busy, the back-off time is utilized by way of the timer counting up toward the back-off time. As shown in scenario (iii), channel 37 is determined to be busy two more times. At these times, the timer is paused and does not count up toward the back-off time. Since the timer does not reach the back-off time before the advertising event window is closed, the BLE device 100 does not transmit the first BLE advertising packet 302 on channel 37. That is, since the value of the timer is less than the value of the back-off time at a point at which the advertising event window is closed, the first BLE advertising packet 302 is not transmitted. Thus, if the timer does not reach the back-off time before advInterval+10 ms, the first BLE advertising packet 302 is not transmitted on channel 37 during this BLE advertising event.

As described above with reference to FIG. 3B, the first BLE advertising packet of a current BLE advertising event is not permitted to be transmitted any sooner than at a time T_advEvent after the start of the first BLE advertising packet of a previous BLE advertising event, in which T_advEvent=advInterval+advDelay. The second and third BLE advertising packets of the current BLE advertising event are each transmitted no more than about 10 ms after the previous packet (measured from packet start to packet start). Thus, the length of a BLE advertising event is no more than about 20 ms plus the length of one packet (e.g., all three packets are the same length, and the longest allowed packet is about 1,518 ms).

FIG. 3C illustrates transmission of a second BLE advertising packet by the BLE device 100 on primary channel 38 after the BLE device 100 successfully transmits the first BLE advertising packet 302 on primary channel 37 according to scenarios (i) and (ii) in FIG. 3B, or after the BLE device 100 refrains from transmitting the first BLE advertising packet 302 on primary channel 37 according to scenario (iii) in FIG. 3B.

Referring to FIG. 3C, the BLE device 100 transmits (or attempts to transmit) a second BLE advertising packet 303 in a similar manner as the first BLE advertising packet 302 as described with reference to FIG. 3B. In FIG. 3C, the target primary channel is channel 38 (e.g., advIdx=38).

In scenario (i), the second BLE advertising packet 303 of the current BLE advertising event is transmitted on primary channel 38 after the BLE device 100 determines that channel 38 is idle during the entirety of the channel assessment time caTime (e.g., the BLE device 100 transmits the second BLE advertising packet 303 after the channel assessment time caTime has elapsed). Otherwise, if channel 38 is detected as being busy during the channel assessment time caTime, a back-off process similar to the back-off process described with reference to FIG. 3B is implemented, as described below with reference to scenarios (ii) and (iii) of FIG. 3C. Compared to the back-off process of FIG. 3B, in the back-off process of FIG. 3C, the second BLE advertising packet 303 is abandoned about 10 ms after the start of the previous BLE advertising packet, or if the previous BLE advertising packet was not transmitted, at a time T_advEvent+20 ms.

In scenario (ii), the second BLE advertising packet 303 is not transmitted immediately after the channel assessment time caTime has elapsed. Rather, the BLE device 100 delays transmission of the second BLE advertising packet 303 when the BLE device 100 determines that the target primary channel (e.g., channel 38) is busy during the channel assessment time caTime. The second BLE advertising packet 303 is then transmitted later after the back-off time. For example, in scenario (ii), during the channel assessment time caTime, the BLE device 100 listens to the target primary channel (e.g., channel 38) and determines that channel 38 is busy during the channel assessment time caTime. Similar to scenario (ii) in FIG. 3B, the second BLE advertising packet 303 is transmitted once the timer reaches the back-off time.

In scenario (iii), the timer does not reach the back-off time before the advertising event window is closed. In this case, the BLE device 100 does not transmit the second BLE advertising event 303 on the target primary channel (e.g., channel 38).

Although FIGS. 3B and 3C illustrate transmission of a first and second BLE advertising packet on channels 37 and 38, respectively, exemplary embodiments of the present invention are not limited thereto, and may apply to any other channels used for the transmission of BLE advertising packets.

Figure 4:
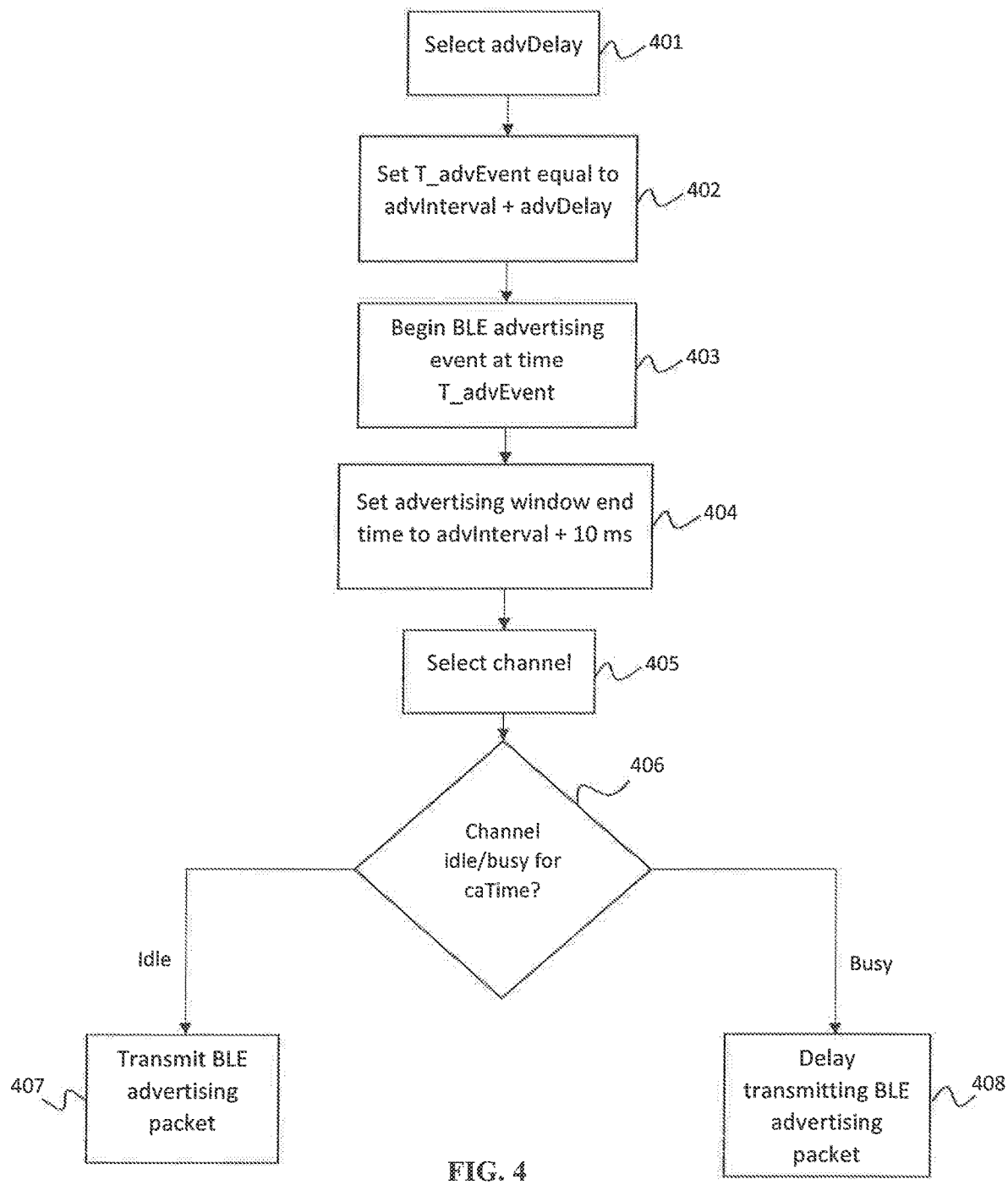
FIG. 4 is a flowchart illustrating a method of transmitting BLE advertising data according to an exemplary embodiment of the present invention.

FIG. 4 is a flowchart illustrating a method of transmitting BLE advertising data according to an exemplary embodiment of the present invention.

The method of transmitting BLE advertising data described with reference to FIG. 4 may be implemented by the BLE device 100 described above.

Referring to FIG. 4, in an exemplary embodiment, after the BLE device 100 has selected the advertising interval advInterval that is to be used for all advertising events belonging to the current advertising data set, the BLE device 100 selects the delay time advDelay (operation 401), and sets T_advEvent to be equal to advInterval+advDelay (operation 402). The time T_advEvent represents the earliest time at which a BLE advertising packet is transmitted. Since T_advEvent=advInterval+advDelay, and since advDelay is randomly or pseudo-randomly generated for each advertising event, the actual value of T_advEvent may be different for different advertising events (due to the variance of advDelay).

The BLE device 100 begins the BLE advertising event at the time T_advEvent (operation 403), and sets the advertising event window end time to advInterval+10 ms (operation 404). Thus, the earliest time at which a BLE advertising packet may be transmitted by the BLE device 100 is T_advEvent (=advInterval+advDelay), and the latest time at which a BLE advertising packet may be transmitted by the BLE device 100 is advInterval+10 ms. The advertising event window end time is a dynamic value that is updated when the BLE device 100 switches to the next primary advertising channel. For example, if the first BLE advertising packet is transmitted on the first primary channel before the advertising event window end time, the advertising event window end time is updated for the second primary channel to be 10 ms after the transmission of the first BLE advertising packet. Otherwise, if the first BLE advertising packet is not transmitted on the first primary channel before the advertising event window end time (e.g., because the first primary channel is busy), the advertising event window end time is extended by 10 ms.

As used herein, the term "advertising event window end time" refers to the time that the advertising event window is closed, at which point the BLE device 100 stops attempting to transmit the BLE advertising packets belonging to the BLE advertising event on the target primary channel in the event that the BLE advertising packets have not yet been transmitted.

The BLE device 100 selects a primary advertising channel as the target channel for transmission of a first BLE advertising packet belonging to the BLE advertising event (operation 405). The BLE device 100 then listens to the selected channel for the channel assessment time caTime to determine whether the selected channel is busy or idle (operation 406) during the channel assessment time caTime. If it is determined that the selected channel is idle for the channel assessment time caTime, the BLE device 100 transmits the first BLE advertising packet on the selected channel (operation 407). Otherwise, if it is determined that the selected channel is busy during the channel assessment time caTime, the BLE device 100 delays transmitting the first BLE advertising packet on the selected channel (operation 408).

Figure 5:
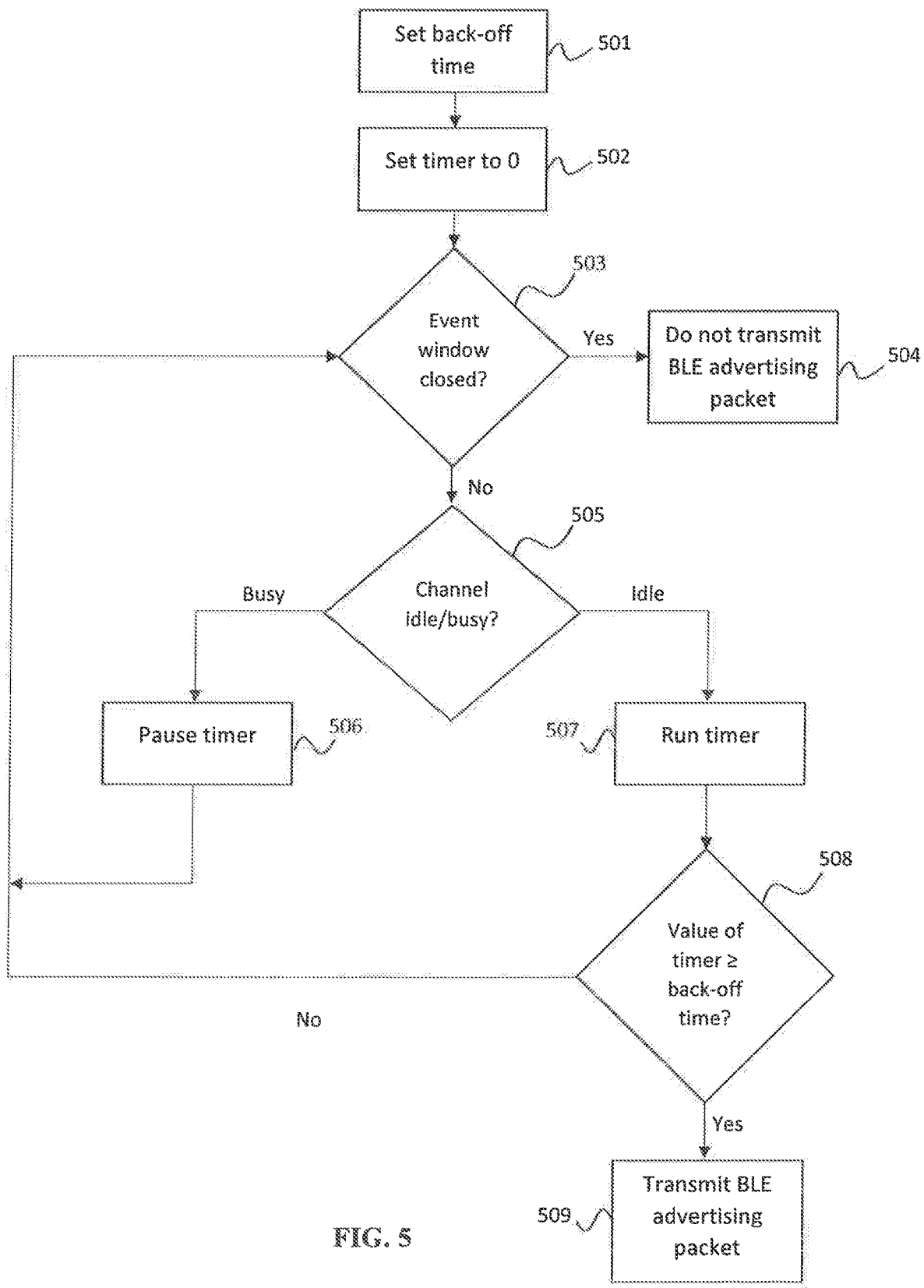
FIG. 5 is a flowchart illustrating a method of delaying transmitting a BLE advertising packet on a selected primary channel according to an exemplary embodiment of the present invention.

FIG. 5 is a flowchart illustrating a method of delaying transmitting a BLE advertising packet on a selected primary channel according to an exemplary embodiment of the present invention. FIG. 5 corresponds to operation 408 of FIG. 4.

Referring to FIG. 5, the BLE device 100 sets the back-off time (operation 501). The back-off time may be a randomly or pseudo-randomly generated number, and may be less than or equal to about 2 ms. The BLE device 100 sets the timer to 0 (operation 502), and determines whether the advertising event window is closed (operation 503). If the BLE device 100 determines that the advertising event window is closed, the BLE device 100 does not transmit the first BLE advertising packet (operation 504). For example, the first BLE device 100 does not transmit the first BLE advertising packet on the selected primary channel when the advertising event window is closed and the value of the timer is less than the back-off time.

If the BLE device 100 determines that the advertising event window is not closed, the BLE device 100 then determines whether the selected primary channel is still busy or is idle (operation 505). If the BLE device 100 determines that the selected primary channel is busy, the timer is not started, or the timer is paused if it has previously been started (operation 506). Otherwise, if the BLE device 100 determines that the selected primary channel is idle, the timer runs (e.g., the timer starts counting up), or the timer is resumed if it has previously been started (operation 507). Thus, the BLE device 100 pauses the timer each time the selected primary channel becomes busy, and resumes the timer each time the selected primary channel becomes idle.

At operation 508, the BLE device 100 determines whether the value of the timer is equal to or greater than the back-off time. If the BLE device 100 determines that the value of the timer is greater than or equal to the back-off time, the BLE device 100 transmits the first BLE advertising packet (operation 509). Otherwise, if the BLE device 100 determines that the value of the timer is less than the back-off time, the method returns to operation 503.

Operations 503, 505 and 508 may be implemented in a variety of manners. For example, operations 503, 505 and 508 may be respectively implemented as a timed alarm. For example, in operation 503, a timed alarm may be used to alert the BLE device 100 when the event window is closed, and in operation 508, a timed alarm may be used to alert the BLE device 100 when the timer has reached the back-off time. In this case, the processor 104 of the BLE device 100 may perform other operations until one of the timed alarms goes off. Similarly, operation 505 may be implemented with an alarm that alerts the BLE device 100 when an incoming BLE advertising packet is detected on the selected primary channel.

Utilizing the channel assessment time caTime with the back-off time, as described above with reference to exemplary embodiments of the present invention, reduces the number of collisions between BLE advertising packets. For example, rather than merely initiating a BLE advertising event regardless of the state of a target advertising channel (e.g., without checking to determine whether a target advertising channel is idle), the BLE device 100 according to exemplary embodiments of the present invention first listens to the target primary channel for the channel assessment time caTime, and does not send its BLE advertising packet unless the target primary channel is idle for the duration of the channel assessment time caTime. If the target primary channel is busy during the channel assessment time caTime, the BLE device 100 delays transmitting the BLE advertising packet until the target primary channel becomes idle and remains idle for the randomly or pseudo-randomly generated back-off time, as described above. Utilization of the randomly or pseudo-randomly generated back-off time with the channel assessment time caTime allows for a large number of BLE devices 100 to be utilized in the same network. For example, since each BLE device 100 does not have the same back-off time, since it is randomly or pseudo-randomly generated, all BLE devices 100 in the same network will not transmit their respective BLE advertising packets at the same time during the transmission delay process.

The flowcharts illustrated in FIGS. 4 and 5 illustrate the process of the BLE device 100 transmitting one BLE advertising packet. As described above, a BLE advertising event transmitted by the BLE device 100 includes the transmission of BLE advertising packets in quick succession on up to three primary channels (e.g., channels 37, 38 and 39 of the 2.4 GHz ISM radio band). It is to be understood that the process described with reference to FIGS. 4 and 5 may be implemented for each of the BLE advertising packets included in one BLE advertising event. For example, referring to one BLE advertising event, the process described with reference to FIGS. 4 and 5 may be repeated to transmit each of the BLE advertising packets belonging to the one BLE advertising event, as long as the advertising event window has not been closed.

According to exemplary embodiments of the present invention, the BLE device 100 may determine whether the target primary channel is busy or idle using a variety of methods. For example, in addition to determining whether the target primary channel is busy or idle based on detection of a BLE advertising packet, the BLE device 100 may determine whether the target primary channel is busy or idle based on the received energy level, based on whether the received signal strength indication (RSSI) of a received packet is above a certain threshold, or based on a combination of these approaches.

When making the determination based on the received energy level, the amount of energy (power) that is arriving at the antenna of the transceiver 101 is measured (e.g., the transceiver 101 may include a power meter). If a BLE advertising packet is being transmitted nearby, a relatively large amount of power will be detected as being received. Otherwise, if there is not a BLE advertising packet being transmitted nearby, only the background power of devices that are far away (e.g., power from microwave ovens, thunderstorms, solar flares, etc.) will be detected. Thus, in an exemplary embodiment, the BLE device 100 may determine whether the target channel is busy or idle when an amount of power detected by the transceiver 101 of the BLE device 100 exceeds a predefined threshold. For example, the predefined threshold may be about −70 dBm. However, it is to be understood that the predefined threshold is not limited thereto.

When making the determination based on whether the RSSI of a received packet is above a certain threshold, the threshold may be dynamically adjusted. For example, the threshold may be dynamically adjusted based on the RSSI of packets received from the nearest relay nodes or the transmit power level. When the determination is made based on the received energy level, a shorter channel assessment time caTime may be selected, since the preamble and access address are not required to be detected.

According to exemplary embodiments of the present invention, the maximum back-off time may be adjusted based on how often the target primary channel is detected as being busy. Further, according to exemplary embodiments, the back-off time may be reset each time the target primary channel becomes busy.

According to exemplary embodiments of the present invention, the back-off time may be initiated earlier when the target primary channel is detected as being busy. For example, in exemplary embodiments, the BLE device 100 may perform an initial channel assessment starting at the time advInterval−caTime, may enable the back-off time to start at the time advInterval when the target primary channel is detected as being busy, and may revert to the time T_advEvent−caTime when the target primary channel is detected as being idle. As a result, the BLE device 100 may have a greater opportunity to transmit BLE advertising packets when the target primary channel is busy.

Although the exemplary embodiments described herein are implemented in a BLE advertising scheme in which BLE advertising packets belonging to a BLE advertising event are sequentially transmitted on three primary advertising channels, the present invention is not limited thereto. For example, in exemplary embodiments, transmission of three BLE advertising packets belonging to a BLE advertising event may be altered such that the packets are randomly transmitted on the three primary advertising channels instead of being sequentially transmitted on the three primary advertising channels. For example, instead of transmitting three BLE advertising packets sequentially on channels 37, 38 and 39 in that order, a first BLE advertising packet may be sent on channel 38, a second BLE advertising packet may then be sent on channel 37, and a third BLE advertising packet may then be sent on channel 39 (this order is merely exemplary, and a different non-sequential order may be implemented).

The various elements and methods described above may be implemented using one or more hardware components, one or more software components, or a combination of one or more hardware components and one or more software components. A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, and processing devices. A software component may be implemented, for example, by a processor (e.g., the processor 104) controlled by software or instructions to perform one or more operations, but is not limited thereto.

As is traditional in the field of the present invention, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies.

In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the present invention.

Exemplary embodiments of the present invention may be embodied directly in hardware, in a software module executed by a processor, or in a combination of the two. A software module may be tangibly embodied on a non-transitory program storage device such as, for example, in RAM, flash memory, ROM, EPROM, EEPROM, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor.

Having described exemplary embodiments for a BLE device transmitting BLE advertising data, and a method of transmitting BLE advertising data, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A BLUETOOTH Low Energy (BLE) device, comprising:
   a BLUETOOTH transceiver;
   a memory storing a computer program; and
   a processor configured to execute the computer program, wherein the computer program is configured to:
   select a primary advertising channel as a target channel for transmission of a first BLE advertising packet belonging to a BLE advertising event;
   listen to the selected channel for a channel assessment time,
   wherein listening to the selected channel comprises determining whether the selected channel is busy or idle; and
   transmit the first BLE advertising packet on the selected channel when it is determined that the selected channel is idle during the channel assessment time.

2. The BLE device of claim 1, wherein the computer program is configured to:
delay transmitting the first BLE advertising packet on the selected channel when it is determined that the selected channel is busy during the channel assessment time.

3. The BLE device of claim 2, wherein the computer program is configured to delay transmitting the first BLE advertising packet by:
setting a back-off time;
starting a timer when the selected channel becomes idle after the channel assessment time; and
transmitting the first BLE advertising packet on the selected channel when a value of the timer is equal to or greater than the back-off time.

4. The BLE device of claim 1, wherein the computer program is configured to:
determine that the selected channel is busy when a preamble or an access address of a BLE advertising packet transmitted by another BLE device is detected on the selected channel.

5. The BLE device of claim 1, wherein the primary advertising channel is channel 37, channel 38, or channel 39 included in a 2.4 GHz Industrial Scientific and Medical (ISM) radio band.

6. The BLE device of claim 1, wherein the computer program is configured to:
select a time advDelay,
wherein advDelay is a randomly or pseudo-randomly generated delay time, and advDelay is independently randomly or pseudo-randomly generated for each of a plurality of BLE advertising events including the BLE advertising event; and
begin the BLE advertising event at a time T_advEvent after a starting time of transmission of a previous BLE advertising event,
wherein T_advEvent=advInterval+advDelay, and advInterval is a BLE advertising interval used by the BLE device for all advertising events belonging to an advertising data set transmitted by the BLE device.

7. The BLE device of claim 1, wherein the computer program is configured to:
determine that the selected channel is busy when an amount of power detected by the BLUETOOTH transceiver exceeds a predefined threshold.

8. A method of transmitting BLUETOOTH Low Energy (BLE) advertising data, comprising:
selecting, by a BLE device, a primary advertising channel as a target channel for transmission of a first BLE advertising packet belonging to a BLE advertising event;
listening, by the BLE device, to the selected channel for a channel assessment time,
wherein listening to the selected channel comprises determining whether the selected channel is busy or idle; and
transmitting, by the BLE device, the first BLE advertising packet on the selected channel when it is determined that the selected channel is idle during the channel assessment time.

9. The method of claim 8, further comprising:
delaying transmitting the first BLE advertising packet on the selected channel when it is determined that the selected channel is busy during the channel assessment time.

10. The method of claim 9, wherein delaying transmitting the first BLE advertising packet comprises:
setting a back-off time;
starting a timer when the selected channel becomes idle after the channel assessment time; and
transmitting the first BLE advertising packet on the selected channel when a value of the timer is equal to or greater than the back-off time.

11. The method of claim 10, further comprising:
pausing the timer each time the selected channel becomes busy; and
resuming the timer each time the selected channel becomes idle.

12. The method of claim 11, wherein the first BLE advertising packet is not transmitted on the selected channel when the value of the timer is less than the back-off time and when an advertising event window is closed.

13. The method of claim 10, wherein the back-off time is a randomly or pseudo-randomly generated number.

14. The method of claim 8, wherein the selected channel is determined to be busy when a preamble or an access address of a BLE advertising packet transmitted by another BLE device is detected on the selected channel.

15. The method of claim 14, wherein a minimum duration of the channel assessment time is equal to a sum of a maximum length of the BLE advertising packet transmitted by the another BLE device, a length of the preamble of the BLE advertising packet transmitted by the another BLE device, and a length of the access address of the BLE advertising packet transmitted by the another BLE device.

16. The method of claim 15, wherein the minimum duration of the channel assessment time is equal to about 416 µs or about 1,854 µs.

17. The method of claim 8, wherein the primary advertising channel is channel 37, channel 38, or channel 39 included in a 2.4 GHz Industrial Scientific and Medical (ISM) radio band.

18. The method of claim 8,
wherein the BLE advertising event begins at a time T_advEvent after a starting time of transmission of a previous BLE advertising event,
wherein T_advEvent=advInterval+advDelay,
wherein advInterval is a BLE advertising interval used by the BLE device for all advertising events belonging to an advertising data set transmitted by the BLE device,
wherein advDelay is a randomly or pseudo-randomly generated delay time selected by the BLE device, and advDelay is independently randomly or pseudo-randomly generated for each of a plurality of BLE advertising events including the BLE advertising event.

19. The method of claim 18, wherein advInterval is between about 20 ms and about 10,485.759375 seconds, and advDelay is between about 0 ms and about 10 ms.

20. The method of claim 8, further comprising:
detecting, by the BLE device, an amount of power received by a BLUETOOTH transceiver of the BLE device; and
determining that the selected channel is busy when the detected amount of power exceeds a predefined threshold.

* * * * *